(12) United States Patent
Parker et al.

(10) Patent No.: US 8,386,750 B2
(45) Date of Patent: Feb. 26, 2013

(54) MULTIPROCESSOR SYSTEM HAVING PROCESSORS WITH DIFFERENT ADDRESS WIDTHS AND METHOD FOR OPERATING THE SAME

(75) Inventors: Michael Parker, San Jose, CA (US);
Timothy J. Johnson, Chippewa Falls, WI (US); Laurence S. Kaplan, Seattle, WA (US); Steven L. Scott, Eau Claire, WI (US); Robert Alverson, Seattle, WA (US); Skef Iterum, Madison, WI (US)

(73) Assignee: Cray Inc., Seattle, WA (US)

( * ) Notice: Subject to any disclaimer, the term of this patent is extended or adjusted under 35 U.S.C. 154(b) by 1097 days.

(21) Appl. No.: 12/263,321

(22) Filed: Oct. 31, 2008

(65) Prior Publication Data

US 2010/0115228 A1 May 6, 2010

(51) Int. Cl.
*G06F 12/08* (2006.01)
(52) U.S. Cl. ............ 711/209; 711/170; 711/212; 712/28
(58) Field of Classification Search ..................... None
See application file for complete search history.

(56) References Cited

U.S. PATENT DOCUMENTS

| | | | |
|---|---|---|---|
| 5,887,146 A * | 3/1999 | Baxter et al. | 710/104 |
| 6,295,584 B1 * | 9/2001 | DeSota et al. | 711/147 |
| 6,665,774 B2 * | 12/2003 | Faanes et al. | 711/118 |
| 6,766,515 B1 * | 7/2004 | Bitar et al. | 718/100 |
| 6,912,716 B1 * | 6/2005 | Johanson et al. | 719/312 |
| 7,543,133 B1 * | 6/2009 | Scott | 711/205 |
| 2004/0044872 A1 * | 3/2004 | Scott | 711/202 |
| 2004/0090976 A1 * | 5/2004 | Shung | 370/412 |

* cited by examiner

*Primary Examiner* — Gary Portka
(74) *Attorney, Agent, or Firm* — Charles A. Lemaire; Lemaire Patent Law Firm, P.L.L.C.

(57) ABSTRACT

A multiprocessor computer system has a plurality of first processors having a first addressable memory space, and a plurality of second processors having a second addressable memory space. The second addressable memory space is of a different size than the first addressable memory space, and the first addressable memory space and second addressable memory space comprise a part of the same common address space.

20 Claims, 1 Drawing Sheet

```
63 62 61           47 46                                         0
┌──┬────────────┬──────────────────────────────────────────────┐
│00│MUST-BE-ZERO│       LOCAL MEMORY VIRTUAL OFFSET            │
└──┴────────────┴──────────────────────────────────────────────┘
                  USER LOCAL MEMORY REGION 63 62 61              44 43                                      0
┌──┬────────────┬────┬─────────────────────────────────────────┐
│01│VIRTUAL NODE│SEG#│     PGAS SEGMENT VIRTUAL OFFSET         │
└──┴────────────┴────┴─────────────────────────────────────────┘
                     PGAS MEMORY REGION 63 62 61 58 57                                                   0
┌──┬────┬────────────────────────────────────────────────────┐
│10│SEG │          DGAS SEGMENT VIRTUAL OFFSET                │
└──┴────┴────────────────────────────────────────────────────┘
                     DGAS MEMORY REGION 63 62 61           47 46                                         0
┌──┬────────────┬──────────────────────────────────────────────┐
│11│MUST-BE-ONE │       LOCAL MEMORY VIRTUAL OFFSET            │
└──┴────────────┴──────────────────────────────────────────────┘
             KERNEL LOCAL VIRTUAL MEMORY SUBREGION 63 62 61              40 39                                      0
┌──┬────────────┬──────────────────────────────────────────────┐
│11│MUST-BE-ZERO│      LOCAL MEMORY PHYSICAL ADDRESS           │
└──┴────────────┴──────────────────────────────────────────────┘
             KERNEL LOCAL PHYSICAL MEMORY SUBREGION
```

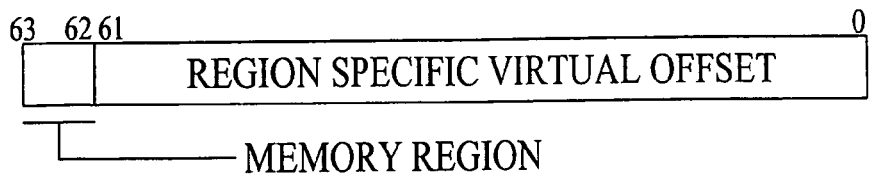
FIG. 1
| VA$_{63..62}$ | MEMORY REGION DESCRIPTION |
|---|---|
| 2'b00 | USER LOCAL MEMORY REGION |
| 2'b01 | PGAS MEMORY REGION |
| 2'b10 | DGAS MEMORY REGION |
| 2'b11 | KERNEL LOCAL MEMORY REGION |
FIG. 2
USER LOCAL MEMORY REGION
PGAS MEMORY REGION
DGAS MEMORY REGION
KERNEL LOCAL VIRTUAL MEMORY SUBREGION
KERNEL LOCAL PHYSICAL MEMORY SUBREGION
FIG. 3

MULTIPROCESSOR SYSTEM HAVING PROCESSORS WITH DIFFERENT ADDRESS WIDTHS AND METHOD FOR OPERATING THE SAME

FIELD OF THE INVENTION

The invention relates generally to multiprocessor computers, and more specifically in one embodiment to a multiprocessor computer system having a unified address space.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Most general purpose computer systems are built around a general-purpose processor, which is typically an integrated circuit operable to perform a wide variety of operations useful for executing a wide variety of software. The processor is able to perform a fixed set of instructions, which collectively are known as the instruction set for the processor. A typical instruction set includes a variety of types of instructions, including arithmetic, logic, and data instructions.

In more sophisticated computer systems, multiple processors are used, and one or more processors runs software that is operable to assign tasks to other processors or to split up a task so that it can be worked on by multiple processors at the same time. In such systems, the data being worked on is typically stored in memory that is either centralized, or is split up among the different processors working on a task.

Instructions from the instruction set of the computer's processor or processor that are chosen to perform a certain task form a software program that can be executed on the computer system. Typically, the software program is first written in a high-level language such as "C" that is easier for a programmer to understand than the processor's instruction set, and a program called a compiler converts the high-level language program code to processor-specific instructions.

In multiprocessor systems, the programmer or the compiler will usually look for tasks that can be performed in parallel, such as calculations where the data used to perform a first calculation are not dependent on the results of certain other calculations such that the first calculation and other calculations can be performed at the same time. The calculations performed at the same time are said to be performed in parallel, and can result in significantly faster execution of the program. Although some programs such as web browsers and word processors don't consume a high percentage of even a single processor's resources and don't have many operations that can be performed in parallel, other operations such as scientific simulation can often run hundreds or thousands of times faster in computers with thousands of parallel processing nodes available.

The processors share data by passing messages back and forth, or by sharing memory between processors. In one shared memory system, each memory address identifies a unique memory location within the computer system, while in other systems some or all memory addresses identify memory local to a processor, and so refer to different memory locations that hold different data in different processors.

The word size of the processor, such as 32-bit or 64-bit words or operands, often also defines the amount of memory that can be directly addressed in the computer system. For example, 32-bit word can identify only 232 or four GigaBytes of memory, while a 64-bit computer can directly address 264 or 16 ExaBytes of memory. Modern computers sometimes use address spaces that are larger or smaller than the word size, such as a 16-bit 8086 processor that uses 20-bit addressing to provide access to one MegaByte of data, or a 64-bit AMD64 processor that supports only 48-bit addressing, recognizing that 256 TeraBytes of memory is likely sufficient and that limiting addressable memory to 48 bits rather than 64 can save complexity and time in memory operations such as address translation and memory page lookup.

It is desirable to manage memory architecture in computer systems for these and other reasons.

SUMMARY

Some embodiments of the invention comprise a multiprocessor computer system has a plurality of first processors having a first addressable memory space, and a plurality of second processors having a second addressable memory space. The second addressable memory space is of a different size or type than the first addressable memory space, and the first addressable memory space and second addressable memory space comprise a part of the same common address space.

BRIEF DESCRIPTION OF THE FIGURES

FIG. 1 shows use of memory address bits to identify different memory regions or types in a computer system, consistent with an example embodiment of the invention.

FIG. 2 shows various memory regions identified by memory address bits in a computer system, consistent with an example embodiment of the invention.

FIG. 3 shows address formats of various memory regions and subregions identified by designated memory address bits in a computer system, consistent with an example embodiment of the invention.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or applications. Other embodiments of the invention exist and are within the scope of the invention, and logical, mechanical, electrical, and other changes may be made without departing from the scope or subject of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

In some embodiments of the invention, a multiprocessor computer system comprises a plurality of first processors having a first addressable memory space, and a plurality of second processors having a second addressable memory space. The first addressable memory space and second addressable memory space comprise a part of the same common address space, and in a further embodiment the first and second addressable memory spaces are of different size.

In another example embodiment, the first addressable memory space is a local memory address space, and the second addressable memory space is a global addressable memory space. In various further embodiments, the first processors comprise scalar processors and the second processors comprise vector processors, the local memory address space comprises a separate user addressable memory space and kernel addressable memory space, the global address space comprises an address space in which a portion of the address bits identify a multiprocessor computer system node in which the memory resides, and only the second processors are operable to access the global addressable memory space.

The address bits in some embodiments include one or more address bits that identify whether the memory address is in the first addressable memory space or the second addressable memory space, such as where the common address space is a unified virtual address space in which different address regions identify different physical and virtual addressable memory spaces.

FIG. 1 is a diagram of a generalized virtual address format, consistent with an example embodiment of the invention. Here, the memory region is identified by address bits 62 and 63 of a 64-bit address, and the region-specific virtual memory address or offset is identified by some or all of bits 0-61.

FIG. 2 shows various memory address regions identified by virtual address bits, consistent with an example embodiment of the invention. Here, bits 62-63 are used to identify one of four memory regions, including the User Local Memory Region identified by bits 00, the Partitioned Global Address Space (PGAS) identified by bits 01, the Distributed Global Address Space (DGAS) identified by bits 10, and the Kernel Local Memory Region identified by bits 11. Here, the User Local Memory Region is a local address space used for user applications, and the Kernel Local Memory Region is a local address space used for operating system operations. These two local address spaces in this example are both accessible to a first type of processor, such as a scalar processor local to the node.

The global address spaces include the Partitioned Global Address space, which is memory that is distributed among the various nodes in the computer system in large blocks, and the Distributed Global Address Space, which is memory that is distributed among the nodes of the computer system with fine granularity. These global address spaces are in some embodiments directly accessible only to a certain type of processor, such as to the vector processors in the local and remote nodes.

These examples enable use of a computer system address space that is larger overall than the address space of processors used within the computer system, such as where multiple processors use different address spaces that are folded into the same common system address space.

FIG. 3 is a more detailed example of a computer system having multiple processors and address spaces within a single system address space. Here, the various memory regions of a multiprocessor computer system having two distinct types of processors are shown. Each node has both one or more vector processors and one or more scalar processors, using different instruction sets, memory architectures, and having other differences. This enables integration of commodity scalar processors and vector processors into the same node and within the same common global address space, providing good vector and scalar performance at relatively low cost.

Different regions of memory are again mapped using the two most significant bits of the 64-bit address space, as shown in FIG. 3. Leading bits 00, for example, refer to a user local memory region that comprises a 48-bit user addressable local virtual memory space. Other regions, such as the memory region identified by 11, include multiple address spaces, such as the kernel local virtual memory subregion and the kernel local physical memory subregion shown near the bottom of FIG. 3. These subregions are distinguished by one or more unused address bits, which here include bits 40-61 or 47-61, depending on the subregion. The subregion can therefore be identified by looking at the value of any bit between 47-61.

In this example, a scalar processor having a 48-bit address space is used along with a vector processor. Addresses in the scalar processor's 48-bit address space are mapped to user local and kernel address spaces. User virtual memory for the scalar processor is mapped to the user local memory region, identified by leading bits 00 as shown in FIG. 3.

In this example, the address space of the scalar processor is sign-extended, such that in general a negative address indicates that the address is mapped to kernel virtual memory. Direct memory references from either the scalar or vector processors can directly access this 48-bit address space. Additionally, a kernel local physical memory region is addressable only to the vector processor, as shown at the bottom of FIG. 3. This enables process streams on the vector processor to bypass address translation and directly access local physical kernel memory. This memory space is protected, such that only kernel-level processes can directly access this memory without generating a memory protection exception.

The memory region 01 is a partitioned globally addressable space, known here as PGAS. It provides 128 separate 37-bit virtual address spaces for each node in the computer system, up to 2^18 nodes. The 128 separate address spaces for each node are identified by bits 37-43, which are referred to as the segment number in FIG. 3. The virtual node space from bits 44-61 identifies which of the 2^18 nodes in the computer system is being addressed. In some further embodiments, two or more segments are grouped together to create a larger contiguous segment, or multiple contiguous node addresses are assigned to the same node providing for In the example system presented here, the vector processors are able to directly address memory in the PGAS region, while the scalar processors are operable to address the various PGAS memory segments by using the node memory manager used to provide address translation for remote memory references. The vector processor or processors on a node are able to locally access the PGAS memory on the local node, but references to other nodes are handled via a NetLink® processor network interface.

The memory region identified by bits 10 in FIG. 3 is the Distributed Global Address Space (DGAS), which is similarly directly accessible by the vector processors and available to the scalar processors through a memory manager interface. The DGAS memory is distributed among nodes at a finer address granularity than the PGAS, though, such that in one example consecutive cache lines are on different system nodes. Because the memory is relatively distributed throughout the system, memory references in a further embodiment are handled as though they are all remote references, and are handled by the NetLink® network interface.

Virtual addresses used for instruction fetches and data references are translated into physical addresses before memory is accessed, according to the translation scheme for the memory region in which they reside. All references are checked at address generation time for alignment errors, and a precise address error exception is raised if an error is found.

Data references are also checked against four core-specific watchpoint registers at address generation time. If an address matches a watchpoint, a precise watchpoint exception is raised.

In addition to the user-visible 64-bit address space, there is an additional 8-bit Address Space IDentifier (ASID) associated with each memory reference. This ASID is generally used to allow the OS to provide protection between jobs on a node. There is a single per-chip ASID for the entire vector processor. Therefore, a vector processor with this configuration can only be executing a single job at a time.

In general, virtual addresses are translated by one of two mechanisms. Local memory addresses are translated via a local TLB. Remote memory addresses are translated into a network logical address, sent to the remote node, and then translated to the final physical address.

On the scalar processor, addresses in the user local memory region and the kernel local memory region are translated directly via its TLB. It is the responsibility of the operating system to manage the TLBs on the scalar processors and on the vector processors to keep them consistent. The scalar processor can in this example only directly reference memory in the user local and kernel local regions of memory.

References to other regions of memory are supported through node hardware, such as a node core memory access windowing mechanism. Hardware does not enforce that virtual addresses on the scalar processor and virtual addresses on the vector processor map to the same physical memory. However, it is expected that, in general, the two address spaces will be managed by the OS to appear consistent.

On the vector processor, memory addresses in the user local memory region (region 00) are translated locally through a TLB in the Load Store Unit (LSU) of the processor core. Specifically, address bits 61-47 are checked to be zero. If they are non-zero, a precise address error exception is raised. If these bits are zero, address bits 63-62 (which are zero in this region) are concatenated with address bits 46-0. The resulting 49-bit address along with the per-chip 8-bit ASID are sent to the TLB for translation. Details of TLB translation are given below.

The kernel local memory region (region 11) is split into two subregions, a kernel local virtual memory subregion and a kernel local physical memory subregion. Addresses in the kernel local virtual memory subregion (region 11 with bit 61 one) are handled in a manner similar to how user local memory region addresses are handled. In this subregion, address bits 60-47 must be ones. If not, a precise address error exception is raised. Otherwise, address bits 63-62 (which are 11 in this region) are concatenated with address bits 46-0. The resulting 49-bit address along with the per-chip ASID are sent to the TLB for translation.

Addresses in the kernel local physical memory subregion (region 11 with bit 61 zero) are not translated through the TLB. If the stream referencing this address is not in the kernel protection level, a protection violation exception is raised. If the stream is in the kernel protection level, the remainder of the checks apply. In this physical space, address bits 60-40 must be zero. If they are not, a precise address error exception is raised. Otherwise the address is sent to the local cache without further translation.

The examples presented here show how different processors, local and global memory, distributed and segmented memory, and other computer system configurations can use separate address spaces that comprise a part of a global address space. Here, commodity scalar processors having a smaller 48-bit address space can be used along side vector processors in a system supporting 64-bit memory addressing, using a system of local and global address spaces. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A multiprocessor computer system, comprising:
a plurality of first processors having addresses with a first number of address bits operable to address locations in a first addressable memory space;
a plurality of second processors having addresses with a second number of address bits operable to address locations in a second addressable memory space, the first number of address bits being smaller than the second number of address bits and the second addressable memory space having a different size than the first addressable memory space; and
a plurality of nodes, wherein each one of the plurality of nodes has at least one of the plurality of first processors and at least one of the plurality of second processors, wherein the first addressable memory space includes a subset of a common address space, wherein the second addressable memory space includes at least a part of the common address space, and wherein a portion of the second addressable memory space is only directly addressable from the plurality of second processors.

2. The multiprocessor computer system of claim 1, wherein the first addressable memory space is a local memory address space, and the second addressable memory space is a global addressable memory space.

3. The multiprocessor computer system of claim 2, wherein the first processors comprise scalar processors and the second processors comprise vector processors.

4. The multiprocessor computer system of claim 2, wherein the local memory address space comprises a separate user addressable memory space and kernel addressable memory space.

5. The multiprocessor computer system of claim 2, wherein the global address space comprises an address space in which a portion of the address bits identify in which one of the plurality of nodes the memory resides.

6. The multiprocessor computer system of claim 2, wherein only the second processors are operable to access the global addressable memory space.

7. The multiprocessor computer system of claim 1, wherein one or more address bits of the common address space identify whether the memory address is in the first addressable memory space or the second addressable memory space.

8. The multiprocessor computer system of claim 1, wherein the common address space is a unified virtual address space in which different address regions identify different physical and virtual addressable memory spaces.

9. A method of operating a multiprocessor computer system, the method comprising:
accessing a first addressable memory space with one of a plurality of a first type of processor having addresses with a first number of address bits operable to address locations in the first addressable memory space;
accessing a second addressable memory space with one of a plurality of a second type of processor having addresses with a second number of address bits operable to address locations in the second addressable memory space; and locating at least one of the plurality of the first type of processor and at least one of the plurality of the second type of processor on each one of a plurality of nodes, wherein the first number of address bits is smaller than the second number of address bits and the second addressable memory space is of a different size than the first addressable memory space, wherein the first addressable memory space includes a subset of a common address space, wherein the second addressable memory space includes at least a part of the common address space, and wherein a portion of the second addressable memory space is only directly addressable from the plurality of the second type of processors.

10. The method of operating a multiprocessor computer system of claim 9, wherein the first addressable memory space is a local memory address space, and the second addressable memory space is a global addressable memory space.

11. The method of operating a multiprocessor computer system of claim 10, wherein the first type of processor comprises a scalar type of processor and the second type of processor comprises a vector type of processor.

12. The method of operating a multiprocessor computer system of claim 10, wherein the local memory address space comprises a separate user addressable memory space and kernel addressable memory space.

13. The method of operating a multiprocessor computer system of claim 10, wherein the global address space comprises an address space in which a portion of the address bits identify in which one of the plurality of nodes the memory resides.

14. The method of operating a multiprocessor computer system of claim 10, wherein only the second type of processor is operable to access the global addressable memory space.

15. The method of operating a multiprocessor computer system of claim 9, wherein one or more address bits of the common address space identify whether the memory address is in the first addressable memory space or the second addressable memory space.

16. The method of operating a multiprocessor computer system of claim 9, wherein the common address space is a unified virtual address space in which different address regions identify different physical and virtual addressable memory spaces.

17. A multiprocessor computer system, comprising:

a plurality of first processors having addresses with a first number of address bits operable to address locations in a first addressable memory space;

a plurality of second processors having addresses with a second number of address bits operable to address locations in a second addressable memory space, the first number of address bits being smaller than the second number of address bits and the second addressable memory space having a different size than the first addressable memory space; and a plurality of nodes, wherein each one of the plurality of nodes has at least one of the plurality of first processors and at least one of the plurality of second processors, wherein the first addressable memory space includes a subset of a common address space, wherein the second addressable memory space includes at least a part of the common address space, wherein a portion of the second addressable memory space is only directly addressable from the plurality of second processors, and wherein the first processors comprise scalar processors and the second processors comprise vector processors.

18. A method of operating a multiprocessor computer system, the method comprising:

accessing a first addressable memory space with one of a plurality of a first type of processor having addresses with a first number of address bits operable to address locations in the first addressable memory space;

accessing a second addressable memory space with one of a plurality of a second type of processor having addresses with a second number of address bits operable to address locations in the second addressable memory space; and locating at least one of the plurality of the first type of processor and at least one of the plurality of the second type of processor on each one of a plurality of nodes, wherein the first number of address bits is smaller than the second number of address bits and the second addressable memory space is of a different size than the first addressable memory space, wherein the first addressable memory space includes a subset of a common address space, wherein the second addressable memory space includes at least a part of the common address space, wherein a portion of the second addressable memory space is only directly addressable from the plurality of the second type of processors, and wherein the first type of processor comprises a scalar type of processor and the second type of processor comprises a vector type of processor.

19. The multiprocessor computer system of claim 17, wherein one or more address bits of the common address space identify whether the memory address is in the first addressable memory space or the second addressable memory space.

20. The method of operating a multiprocessor computer system of claim 18, wherein one or more address bits of the common address space identify whether the memory address is in the first addressable memory space or the second addressable memory space.

* * * * *